Nov. 6, 1934.　　　　D. C. KLAUSMEYER　　　1,979,473
COLUMN CLAMP AND POWER FEED INTERLOCK
Filed March 11, 1930　　　3 Sheets-Sheet 1
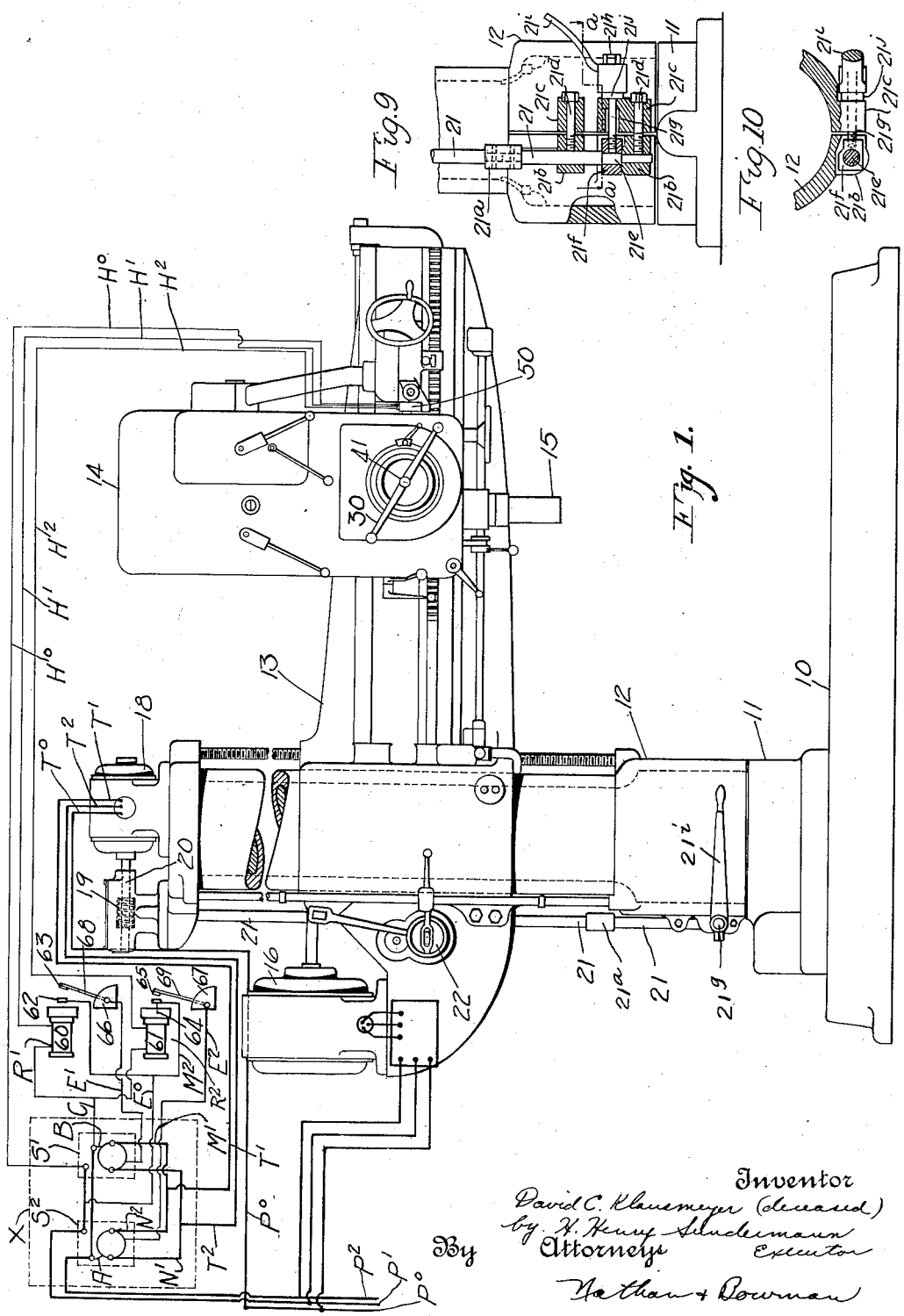

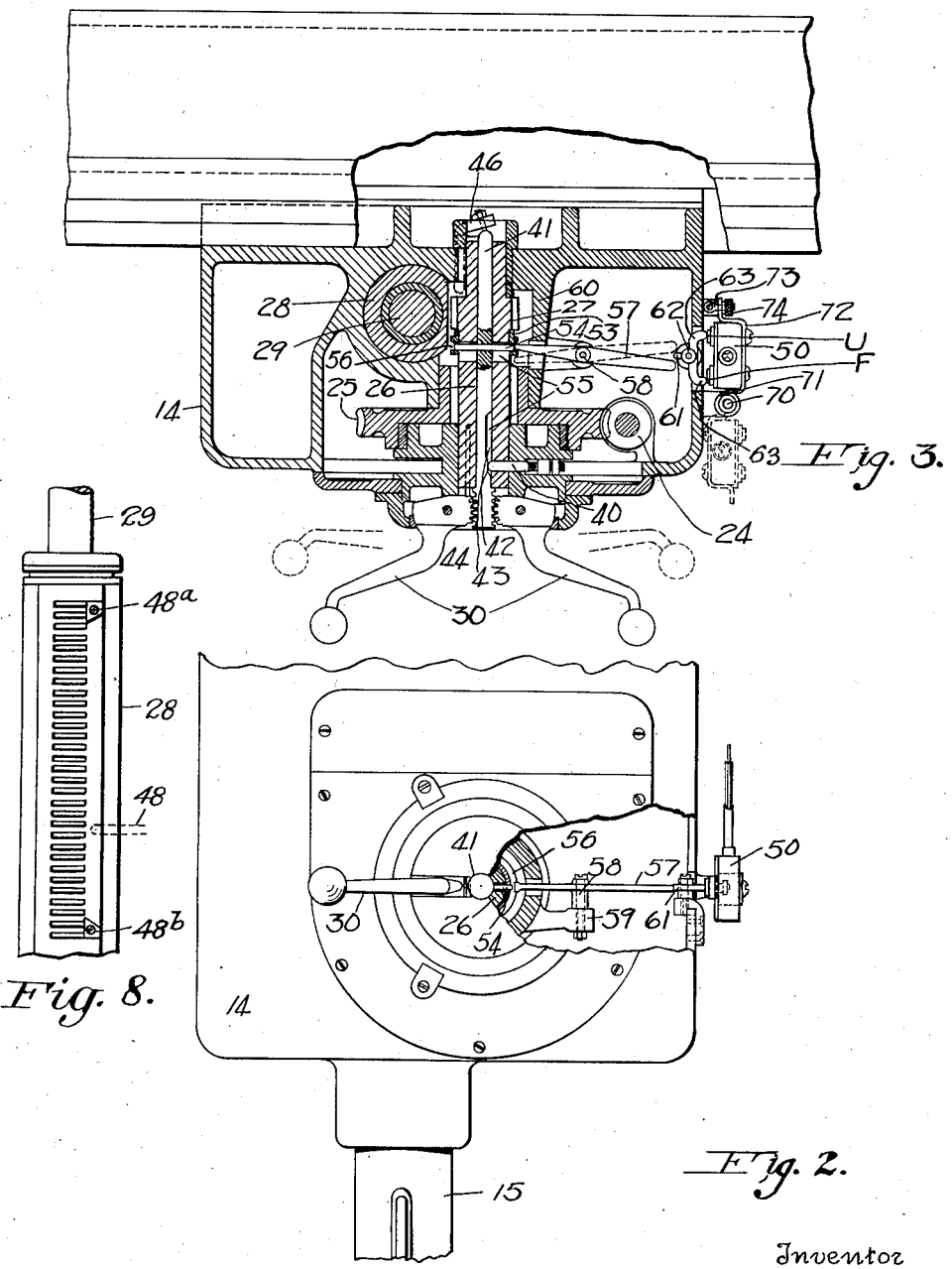

Nov. 6, 1934.   D. C. KLAUSMEYER   1,979,473
COLUMN CLAMP AND POWER FEED INTERLOCK
Filed March 11, 1930   3 Sheets-Sheet 3
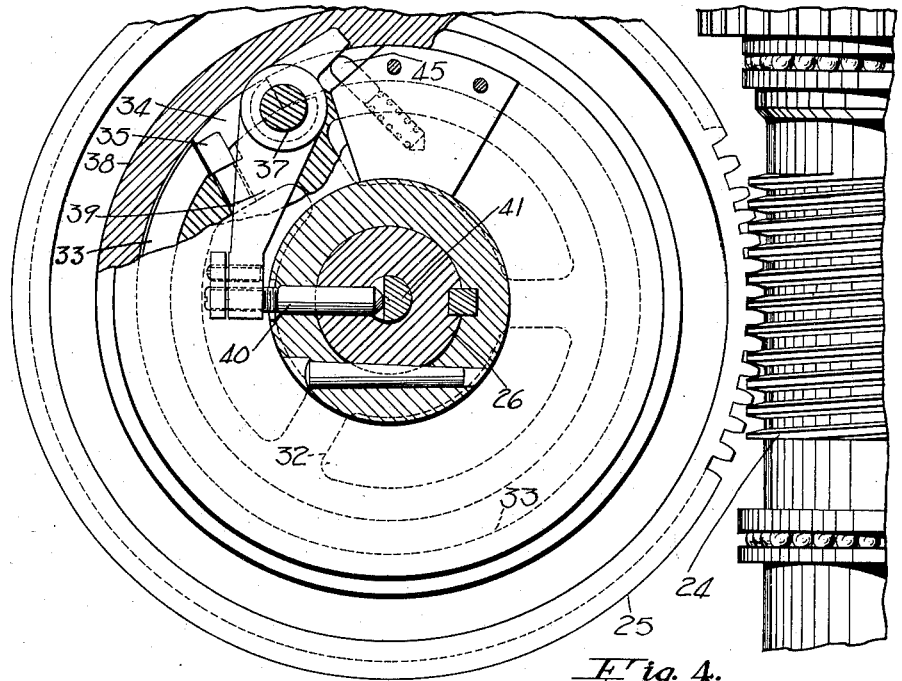
Fig. 4.
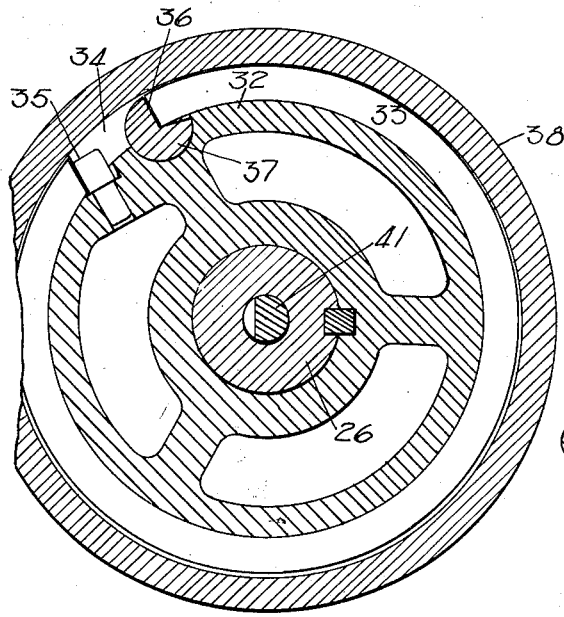
Fig. 5.
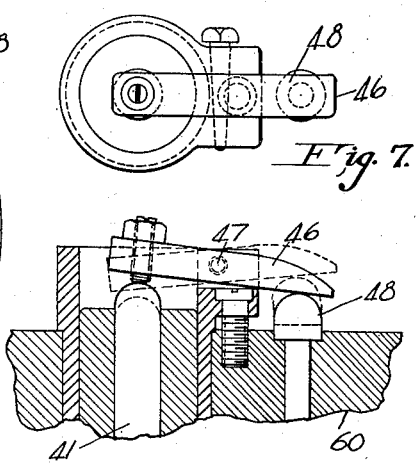
Fig. 7.
Fig. 6.
Inventor
David C. Klausmeyer (deceased)
by H. Henry Sundermann Executor
By Attorneys
Nathan & Bowman Patented Nov. 6, 1934

1,979,473

UNITED STATES PATENT OFFICE 1,979,473

COLUMN CLAMP AND POWER FEED INTERLOCK

David C. Klausmeyer, deceased, late of Cincinnati, Ohio, by H. Henry Sundermann, executor, Cincinnati, Ohio, assignor to The Cincinnati Bickford Tool Company, Cincinnati, Ohio, a corporation of Ohio Application March 11, 1930, Serial No. 435,002

20 Claims. (Cl. 77—28)

In machine tools of particularly the more ponderous variety having major members thereof adjustable to accommodate different types and different positions of the work, or of the cutter tool, it has long been recognized that accuracy of finished product and preservation of the machine tool itself required the incorporation and association with such tool of means for clamping the adjustable frame parts to the support during working operation. Accordingly, many effective mechanisms for this purpose have been developed and provided as part of the normal construction of machine tools. Also much research has been devoted to the purpose of rendering these mechanisms at the same time convenient to, and easily manipulative by the operator. Prominent among these mechanisms have been arrangements which involved the use of an electric motor for operating the clamping means, whereby the operator is relieved of the manual labor and to some degree the time involved in operating one of these clamping mechanisms, such power means being of particular advantage where the machine is large and heavy.

Irrespective however, of the convenience to the operator afforded by these devices they have proven inadequate in certain respects for general production usage. Operators, under the pressure of quantity production, especially where operating on piece-work, neglect or forget, after adjustment of the movable part, to clamp the part in its adjusted position. This is typically illustrated in the operation of a radial drilling machine, such as that disclosed in this application. In a machine of this type a normal characteristic of the machine is a long overhanging arm rotatably supported on a main frame whereby it may be adjusted angularly about the support to bring the drill spindle in proper relation with the work-piece. After such relation has been established the adjustable member is clamped in position by one of the many devices which have been generally noted above and the operator then proceeds to throw in the power feed. However, it is this clamping operation which is frequently omitted by the operator due, in some cases to forgetfulness and, what is probably more frequently the case, to deliberate omission in order to save himself work and the delay attendant upon the clamping operation.

Operating a machine under such conditions, without the parts being clamped, frequently results in very serious effects, chief among which are the inaccuracy of the finished product due to the fact that the drill is not rigidly held in place; and also results in stresses being placed on machine tool parts normally not intended or adapted to receive such stresses.

The present invention contemplates as a primary object thereof the elimination of these defects by rendering the clamping means automatically operative upon applying the power feed. In the normal procedure the operator jockeys the drill arm around and simultaneously advances the drill spindle manually until it has been spotted, or caused to enter the guide bushing, as the case may be, and thereupon applies the power feed. By the arrangement disclosed herein, upon the application of the power feed, a control to the clamping means is automatically operated resulting in the immediate application of a power clamp securing the arm to its support. Conversely, upon the completion of the drilling operation and the throwing out of the power feed the power clamp is immediately released and the drill arm is free to be swung out of position to permit the adjustment of the work-piece or substitution of another.

A characteristic of clamping means of the type employed herein is the fact that the range of operation from extreme clamped and unclamped position is relatively short and, furthermore, such extreme positions are substantially dead stop positions. Various arrangements have been provided adapted to act as a resilient bumper at the stop positions. The gradually increasing resistance of the clamp itself affords, to some degree, a buffer for the power means. The essential fact remains, however, that the power means is normally brought up against a comparatively sudden stop after a relatively short period of operation, and in the case of electrically operated devices, such as a motor most commonly employed, the devices are subject to the danger of burning out or other injury by continued application of the current. A clamping mechanism of this nature is disclosed in United States patent to Klausmeyer, No. 1,875,017 dated August 30, 1932.

The present invention meets these problems in a very efficient manner. The essential features of the organization in this respect consist of a primary switch and operating mechanism positioned adjacent the drill spindle where engagement or disengagement of the power feed results, in each case, in a momentary operation of the switch. The primary switch is electrically connected through suitable circuits, with timed mechanical relay switches, which, following a momentary operation of the initial switch, are closed and remain closed for a definite limited period, in accordance with an adjustable timed mechanism incorporated therein. Closing one of these relay switches energizes a main contact switch, which results in the operation of the motor and thereby the clamp in a certain direction. Corresponding means are provided for energizing contact switches for directing the flow of current in such manner as to cause the motor to operate in the reverse direction. The relay switches are timed to remain closed for a period sufficient only to perform the operation desired, and it will be apparent that freedom from injury to the mechanism is assured. In this respect it may be noted that the arrangement is superior to, and safer than, one in which the switch is directly manually operated with the liability, through absent-mindedness of the operator or some other condition, to permit the current to remain on for an unnecessarily long period.

As a further feature incorporated in the organization the arrangement affords the advantage of a control switch which may be easily altered as to position to disengage the automatic operation and be conveniently accessible for direct manual operation. With the resort to manual operation the arrangement still affords many advantages, prominent among which is the function whereby all that is required of the operator is a momentary pressing of the button of the control switch and the remaining operation occurs automatically, the power clamping means being applied for the desired predetermined interval, in accordance with the requirement.

Other objects are concerned with the simplicity and compactness of the design, particularly in the details of the automatic operation of the control switch from the power feed clutch means.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a radial drilling machine having incorporated therein a specific embodiment of the present invention. Fig. 2 is a fragmentary view of the drill saddle with portions of the casing broken away to show details of the control. Fig. 3 is a horizontal sectional view of the drill saddle and portion of the arm, showing details of the means for automatically operating the control switch. Fig. 4 is a fragmentary view showing particularly the power clutch means for feeding the drill spindle. Fig. 5 is a detail view showing certain elements of the power clutch. Fig. 6 is a fragmentary view partially in section showing in part an automatic arrangement for throwing out the power feed; and Fig. 7 is a view similar to Fig. 6 looking from the top thereof. Fig. 8 is a detached view of the spindle showing cams thereon for automatically throwing out the power feed. Fig. 9 is a detail view, partly in section, of the lower portion of the column, looking from the left of Fig. 1 showing details of the clamping mechanism. Fig. 10 is a detail horizontal section on line a—a of Fig. 9.

Referring first to Fig. 1 the machine shown therein is a more or less conventional radial drilling machine consisting of a base 10 having integral therewith a post 11 shown partly in broken lines where encompassed by the rotary sleeve 12 upon which is supported the radial drill arm 13, vertically translatable upon the sleeve 12, which in turn is rotatable upon the post 11. The radial drill arm carries the usual drill saddle 14 having therein the drill spindle 15. The power for rotating and feeding the spindle is derived from the motor 16 mounted on the rear of the arm having suitable driving mechanism leading to the drill spindle 15.

In the specific form of drill illustrated herein, wherein the drill arm is supported on the rotary sleeve, the arm is secured against rotation in its adjusted angular position about the post 11 by means of a clamp located adjacent the bottom end of the sleeve 12, such sleeve being vertically split in the present specific form and clamping being effected by contracting this split portion. However, any of the other well known types of constructions and clamping means may be employed. The present form of power clamping means consists of a motor 18 located on the upper end of the column, having on the shaft thereof a worm 19 engaging with the worm wheel 20 connected to a vertical shaft 21 leading to the clamping means adjacent the base. Preferably the shaft 21 is made of two sections connected together by a coupling 21$^a$. The lower section is journaled in ears 21$^b$ projecting from the enlarged lower portion of the sleeve 12 at one side of the vertical split therein. Complemental ears 21$^c$ are also formed on the enlarged portion of the sleeve at the opposite side of said split and limit bolts 21$^d$ passed loosely through the last named ears and threaded into the ears 21$^b$ limit the expansion of the clamping portion.

Intermediate the ears 21$^b$ the lower shaft section is formed with an eccentric portion 21$^e$ surrounded by a strap 21$^f$ into which is threaded a draw bolt 21$^g$ which projects through one of the ears 21$^c$ and has its head 21$^h$ connected with the ear through the medium of a hub of a hand lever 21$^i$ and a thrust bearing 21$^j$. It will readily be perceived that oscillation of the shaft 21 to the position shown in Fig. 10 will move the bolt axially and thereby effect contraction of the split portion of the sleeve into gripping contact with the post. If desired, the clamp may be actuated manually by turning the hand lever 21$^i$, thereby threading the bolt 21$^g$ into the strap 21$^f$ and thus contracting the split clamping element.

The parts are normally so adjusted that as the eccentric 21$^e$ approaches its position the clamp element will be tightly gripped upon the post and will set up a high resistance which will result in stalling the motor 18 before the dead center position is reached. Means for clamping the drill arm to the sleeve are shown generally at 22, the details of which, for the purposes of the present invention, need not be discussed.

The feeding mechanism for the drill spindle includes a worm 24 adapted to be driven by suitable mechanism, not shown, from the motor 16, through gearing in the saddle. The worm meshes with a worm wheel 25 adapted, through a suitable clutch, to be engaged at will with the drive shaft 26 mounted in bearings in the drill saddle, the shaft 26 having therein or integral therewith a gear 27 meshing with rack teeth on the sleeve 28 in which the drill spindle 29 is rotatably mounted, but through the interposition of suitable bearings to be translatable with the sleeve 28. The hand levers 30 serve the dual function of a manual means for rotating the shaft 26 and thereby feeding the drill spindle sleeve 28; and through outward or inward movement to engage or disengage the power feed. The inner position of the lever 30 shown in broken lines in Fig. 3 illustrates the power disengaging position.

The details of the clutch are similar to those shown in the patent to Schauer #756,185 and consist in general of a casing or head 32 and expansible ring 33, split at 34, as shown in Fig. 5. One end of the ring 33 bears against the abutment 35, while the other end engages a notch or cam 36 provided by the rock shaft 37. Rocking of the shaft 37 expands the ring 33 and frictionally locks the casing 32 to the flange 38 integral with the worm wheel 25. The means for rocking the shaft 37 is best shown in Fig. 4 and includes lever 39 secured thereon, one end of the lever 39 having the pin 40 projecting therefrom which engages with the slender shaft 41 slidably mounted in a bore of the outer shaft 26 and rotatable therewith. The shaft 41 is provided with a cam surface 42. Inward movement of the shaft 41 brings the high portion 43 of the cam surface into engagement with the pin 40 which rocks the shaft 37 to engage the power feed. Longitudinal movement of the shaft 41 is accomplished through the levers 30 having integral therewith segmental gear teeth 44 meshing with rack teeth on the shaft 41. A spring pressed plunger 45, shown in Fig. 4, serves normally to maintain the clutch disengaged. In Fig. 5 the ring 33 is shown unexpanded with the clutch running free. The space between the ring 33 and the flange 38 is, of course, exaggerated in this figure in the interests of more clearly showing the construction. Normally this space would be too small to be apparent to the eye.

An automatic means for throwing out the power feed is shown in part in Fig. 6 and includes a rockable lever 46 pivoted at 47 in a sleeve secured in the drill head, the lever engaging with the end of the shaft 41 and having its opposite end in engagement with a plunger pin 48 mounted in the drill head which is adapted to be forced inwardly to rock the lever 46. This inward movement of the pin 48 may be automatically produced by adjustable dogs mounted on and translatable with the drill spindle sleeve in accordance with well known constructions. In Fig. 8 are shown cams 48$^a$ and 48$^b$ adapted to engage the inner end of the pin 48 and force it in the direction of the lever 46 to rock the latter and release the clutch at any selected point in the travel of the spindle.

Details of the control for the power clamping means will now be described and consist of a push button type of electric switch 50 mounted on the side of the drill saddle being provided with two push buttons F and U for forward and reverse operation of the power clamping means as will later be described. Means for momentarily depressing one of these buttons, as the power feed clutch is engaged or disengaged, consists of a collar 53 mounted on and rotatable with the shaft 26 and also control shaft 41 through the medium of the pin 54 extending through the control shaft 41. Slots 55 in the shaft 26 permit movement of the pin 54 and thereby the collar 53 longitudinally of the shaft 26. The collar 53 is provided with an annular groove 56 in which tracks the inner end of a lever 57 pivoted at 58 to a bracket 59 projecting from and integral with the interior hub portion 60 of the saddle. The outer end of the lever 57 is adapted, upon being rocked, to engage with the cam 61 pivoted to the saddle at 62 having fingers 63 engaging with the buttons F and U respectively of the control switch. The buttons F and U are spring pressed in accordance with the usual construction of these types of switches whereby the contacts, which they control, are normally disengaged and the circuit broken. Longitudinal movement of the control shaft 41 causes the depression of one of these buttons for a brief interval until the outer end of the lever 57 passes the cam 61 and the button which was depressed being thereupon permitted to return to its former position.

Referring to the features of the electrical control system, it will be appreciated that various types of circuits, as e. g. direct current or alternating current, and of different phases will be employed, depending upon the power available, and for the purposes of the present invention a three-phase alternating current type of circuit is shown which is one in common usage. Only such details thereof as are necessary for an understanding of the principles of this invention will be specifically described, inasmuch as the specific mechanisms will vary in accordance with the particular types of circuits and the commercial switches and other equipment available. In the three-phase system shown, main power lines $P^0$, $P^1$ and $P^2$ have branches leading to the main driving motor 16 and other branches leading to the clamp motor 18 with the insertion of control switches in the lines $P^1$ and $P^2$ for the purposes of opening and closing the circuit and for transposing the connections thereof to produce rotations in opposite directions. The circuit is shown diagrammatically with details of the switches and contacts omitted in the interest of simplicity of disclosure. It may be noted however that a circuit of the type shown herein but without the relay switches is disclosed in greater detail in co-pending application, Serial No. 346,462, filed March 12, 1929.

An important and primary feature of this invention is the insertion in the line, of automatically timed relays for governing the period during which the motor 18 is made operative in the respective directions. In the specific embodiment hereof these relay devices take the form of an electric switch having a magnet which may be initially energized through operation of one of the push buttons F or U of the control switch 50. The relay switches are shown at $R^1$ and $R^2$ and are adapted to control the two double contact main switches $S^1$ and $S^2$ respectively located within the panel X. Three wires lead to the control switch 50, such wires being designated $H^0$, $H^1$ and $H^2$, the line $H^0$ being common to the switches controlled by both buttons U and F, i. e. depression of button U connects lines $H^0$ and $H^2$, and depression of button F connects lines $H^0$ and $H^1$. The line $H^0$ is a branch of the main power line $P^1$. The magnetic coil 60 of relay switch $R^1$ is connected in series with the line $H^1$, which in turn is connected to the main power line $P^2$. In a similar manner the coil 61 of relay switch $R^2$ is connected in series with the line $H^2$ which also is connected with the power line $P^2$. The details of the main switches $S^1$ and $S^2$ are not shown since any one of many commercial types may be employed, the functions being in general, e. g. a double contact switch in which energizing of the magnetic coil therein serves, in the case of switch $S^1$, through interior contacts to connect the power line $P^1$ with $M^1$ and power line $P^2$ with $M^2$.

The contacts in switch S² are reversed from those in switch S¹, the net result of the two switches being to reverse the connections P¹ and P² to the clamp motor, P⁰ remaining unchanged, and thereby to cause the clamp motor to operate in one direction or the other depending upon which switch S¹ or S² is effective. The switch S¹ is under the control of, and is operated by the relay switch R¹, the switch S¹ being closed when contacts 62 and 63 are closed through energizing of the coil 60. Likewise, closing of the contacts 64 and 65 of relay switch R² serves to energize the coil of S² and to close the contacts thereof. The period that the contacts of one of the relay switches is closed is dependent upon the setting of the timing mechanism indicated at 66 in relay switch R¹ and 67 in relay switch R². Any suitable well known timing devices may be employed for this purpose and it is not considered necessary to encumber this description with details thereof. Reference may be made, if desired, to the devices shown in Patents No. 1,270,235, dated June 18, 1918 or No. 1,562,020, dated November 17, 1925 as showing typical well known mechanisms designed to accomplish the purpose here sought. Suffice it to say that this mechanism can be adjusted to hold the contacts in engagement a predetermined period after they have been initially closed and thereafter to automatically release the lever 68 or 69 and cause the energizing circuits to the main switches S¹ or S² respectively to be broken.

The circuits can be more clearly understood from a description of the details and functions of the operations as they occur. It may be assumed that push button F serves to cause the motor 18 to operate in a direction to render the clamp effective. Depressing button F for any brief period, no matter how short, connects the lines H¹ and H⁰ and current passes through the coil 60 of the relay switch R¹ closing the contacts 62 and 63 connecting in circuit the lines E⁰ and E¹ and thereby energizing the magnetic switch S¹ which causes the throwing of its armature to connect the power line P¹ with the branch line M¹ which is connected to the terminal T¹ of the motor. Switch S¹ at the same time connects the power line P² with the branch line M² and in turn to the terminal T² of the motor. The motor 18 then being connected to the three power lines P⁰, P¹ and P² operates to close the clamp.

For the reverse or unclamping operation button U is depressed to connect lines H² and H⁰ permitting current to pass through the coil 61 to relay switch R² causing contact 65 to engage with contact 64 and thereby connecting lines E⁰ and E², thereby energizing the solenoid of switch S² which causes its armature to be thrown and to establish the connection of power line P¹ with N¹ and thereby to T² and also of power line P² with N² and thereby to T¹. The motor then operates in the reverse or unclamping direction.

With the timing devices incorporated in the relay switches R¹ and R² the current is applied to the clamping motor for a sufficient period only to operate the motor in the particular direction to the extreme position of the clamp and thereafter to automatically break the circuit. Obviously, the interval that the current remains on the motor after it has reached its extreme clamped or unclamped position may be made as small as desired and all danger of burning out the motor or any of the relay mechanism is eliminated. All this takes place automatically, the only operation required to initiate the cycle being the depression momentarily of one of the buttons U or F which, as has been described, automatically occurs upon engaging or disengaging the power feed to the spindle feed. The normal operation would consist of the operator grasping the drill arm 13 and at the same time manually advancing, through the rotation of the levers 30, the drill spindle toward the work and, if necessary, adjusting the saddle along the arm which may be done by power means in accordance with mechanisms now designed for that purpose, and upon the drill being spotted, or engaging in the drill bushing, the levers 30 are pulled outwardly to engage the clutch for applying the power feed. This operation serves to depress the button F and to effect, through the control circuit just described, the operation of the clamping mechanism. Conversely, when the drill has completed its depth of cut the control rod 41 is moved outwardly automatically or manually, which depresses the button U and serves to release the clamp and the arm is immediately free to be swung out of position.

A very useful provision is incorporated in the organization which permits the control switch to be swung into the position shown in broken lines in Fig. 3, whereby the automatic operation of the clamping means is disengaged and the buttons U and F are conveniently located for manual operation independently of the application of the power feed to the drill spindle. This alternative positioning of the switch 50 is accomplished through the mounting of the switch 50 which consists of pivoting the switch 50 at 70 upon a bracket 71 projecting from the drill saddle. The opposite edge of the switch 50 has secured thereto a notched or U-shaped hasp 72 into which the pivoted link 73 may be swung and secured in position by the thumb nut 74.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, it is claimed as new and desired to secure the following combinations and elements, or equivalents thereof, by Letters Patent of United States:—

1. A machine tool combining a support; a member movably mounted thereon; power operated means for securing said member to said support; an element translatably carried by said member; manual means movable in one plane for translating said element; power means for translating said element; means electively operable from said manual means when moved in another plane for rendering said power means effective; and means for automatically rendering said securing means effective when said power means is made effective by said manual means.

2. A machine tool combining a support; a member adjustable as to its position thereon; power means selectively operable for securing said member in such adjusted position; an electric control therefor; an element translatably mounted on said member; a switch forming a part of said electric control; power means for feeding said element; a manually operable clutch for electively connecting said power feeding means; a lever for actuating said clutch; and a switch actuating lever operated from said clutch actuating lever for operating said switch for controlling said securing means.

3. A radial drill combining a column; a sleeve adjustably mounted thereon; a tool head supported from said sleeve; power operated means including an electric motor for clamping said sleeve in adjusted position; and electric circuit means for controlling said motor comprising a main circuit having connection with said motor for controlling the latter upon opening and closing said main circuit, a mechanical relay switch in said main circuit adapted upon momentary operation to maintain said main circuit closed for a predetermined period to cause the motor to actuate said clamping means, an auxiliary circuit having means therein associated with said relay switch to operate the latter, and switch means in said auxiliary circuit.

4. A machine tool combining a support; a major member adjustably mounted thereon; means for securing said member in adjusted position; power means for operating said securing means; and electric circuit means for controlling the application of said power means having therein a relay switch adapted upon momentary operation to maintain said circuit closed for a predetermined period.

5. A machine tool combining a support; a major tool part adjustably mounted thereon; means for securing said tool part in adjusted position; power means for operating said securing means; and electric means for controlling the application of said power means including an electric circuit, a timed relay switch therein adapted upon momentary operation to maintain said circuit closed for a predetermined period during which said power means is effective, and means for momentarily operating said switch.

6. A machine tool combining a support; a member movably mounted thereon; clamping means for securing said member to said support; electric circuit means for controlling said clamping means; an electric control switch therein; a translatable spindle carried by said member; power means for feeding said spindle; manual means movable in one direction for feeding said spindle and movable in another direction for connecting or disconnecting at will said power means; and means for operating said switch by operation of said last named means in its movement to actuate said power means.

7. A machine tool combining a support; a member movably mounted thereon; power driven clamping means therefor; a translatable element; power means for feeding said element; a manually actuable element for rendering said power means effective at will; an electric circuit for controlling the operation of said clamping means including a timed relay mechanism; a control switch for said circuit associated with said relay mechanism; and means actuated by said manually actuable element for momentarily operating said control switch upon rendering said power feeding means effective, said timed relay mechanism being thereupon operative to cause through said control circuit the operation of said clamping means in one direction and at the completion thereof to render the power drive therefor ineffective.

8. A drilling machine combining a support; a member movably mounted thereon; clamping means therefor; electric circuit means for controlling the operation of said clamping means; a translatable spindle; disconnectible power means for feeding said spindle; a manually actuable element movable in one plane to effect feeding movements of said spindle and movable in another plane to connect or disconnect said power feeding means; a control switch in said electric circuit and means operated by movement of said manually actuable element when moved either to connect or disconnect the power means to operate said switch.

9. A drilling machine combining a support; a member movably mounted thereon; means for securing said member to said support; a translatable spindle; power means electively available for feeding said spindle; means movable to render said power means effective or ineffective; electric circuit means for controlling the operation of said clamping means; a control switch in said circuit normally supported in one position adjacent said spindle; means automatically operated by movement of said movable means to operate said switch; and means for adjusting said switch to another position without disconnecting it from said circuit to thereby disengage it from said automatic operation and render it available for independent manual operation.

10. A drilling machine combining a main frame; a supporting member adjustably mounted thereon; power driven means for clamping said member in adjusted position; control means therefor including an electric circuit having a control switch on said supporting member; a spindle translatably mounted on said member; power driven means for translating said spindle; a handle having connections for translating said spindle by rotary movement of said handle; means for electively rendering said power drive to the spindle effective or ineffective by shifting of said lever in a direction transverse to its rotary motion; and means for simultaneously operating said control switch by said transverse movement to render said clamping means correspondingly effective or ineffective.

11. A machine tool combining a frame; a supporting member adjustably mounted thereon; power driven means for clamping said member in adjusted position; control means therefor including an electric circuit, a control switch and a switch actuating lever; a spindle translatably carried by said member; a rotatably mounted element geared to said spindle to translate the latter; a manually operable lever movable in one plane to rotate said element; power driven means for rotating said element; control means therefor; a rod carried by said element axially movable with respect thereto; means for axially shifting said rod by movement of said hand lever in another plane; and connections for operating each of said control means by the shifting of said rod.

12. A machine tool combining a support; a member adjustably mounted thereon; means for clamping said member in adjusted positions; an electric motor drive for said clamping means; an electric circuit control means therefor including a relay switch and a time control means for said relay switch; adapted upon being initially operated to maintain said electric motor drive effective until complete clamping has been effected and the motor stalled, and to thereafter automatically break the circuit.

13. A machine tool combining a frame; a member adjustably mounted thereon; means for clamping said member in adjusted positions; an electric motor drive for said clamping means; timed relay switch means for controlling the circuit to said motor; a major working element mounted on said member; power means for operating said element; control means electively operable to render said power means effective or ineffective; and means simultaneously operable, when said control means is operated to render said power means effective, to close said relay switch means and thereby to cause operation of said clamping motor until complete clamping has been effected and the motor stalled, said relay switch being automatically operable thereafter to break the circuit to said motor.

14. A machine tool combining a frame; a member adjustably mounted thereon; means for clamping said member in adjusted positions; electric motor driving means for operating said clamping means; relay switch means for controlling the circuit to said motor; manually operable means for initially closing said relay switch means to cause operation of said motor; and means for automatically releasing said switch means after operation of said motor for a predetermined period sufficient to move said clamping means to a completely clamped or unclamped position as the case may be.

15. A machine tool combining a frame; a supporting member adjustably mounted thereon; means for clamping said member in adjusted positions; an electric motor for operating said clamping means; a spindle carried by said member; power driven means for translating said spindle; timed relay switch means for controlling the circuit to said motor; controlling means for rendering said power translating means effective or ineffective; and means simultaneously operable from said controlling means for closing said relay switch means when said power drive is rendered effective, said relay switch means being automatically operable after a predetermined period sufficient to operate said clamping means to completely clamped position, to thereafter open said circuit.

16. A machine tool combining a support; a member adjustable thereon; means for securing said member to said support; reversible power means controlled from an electric switch device for actuating said securing means; an element translatably carried by said member; power means for feeding said element; manual means for electively rendering said power feeding means effective or ineffective; and means actuated by said manual means as it renders said power feeding means effective for automatically operating said switch to cause said securing means to become effective, and to reverse the first named power means thereby to release said securing means when said power means is made ineffective.

17. A machine tool combining a support; a member adjustable thereon; reversible power means selectively operable in one direction for securing said member in such adjusted position and in the opposite direction for releasing said securing means; an electric control for said power means; an element translatably mounted on said member; a switch carried by said element forming a part of said electric control; power means for feeding said element; a manually operable clutch for electively connecting said power feeding means; a lever for actuating said clutch; and a switch actuating lever operated from said clutch actuating lever for operating said switch thereby to cause said member to be secured to said support when said feeding means is made effective and to release said member when said feeding means is made ineffective.

18. A drilling machine combining a support; a member movably mounted thereon; means including a reversible motor for securing said member to said support; a translatable spindle; power means electively available for feeding said spindle; means movable to render said power means effective or ineffective; electric circuit means for controlling the operation of said securing means; a control switch in said circuit normally supported in one position adjacent said spindle; means automatically operated by movement of said movable means to operate said switch to render said securing means effective when said power feed means is made effective and to render the securing means ineffective when the power feeding means is made ineffective; and means for adjusting said switch to another position without disconnecting it from said circuit, to thereby disengage it from said automatic operation and render it available for independent manual operation.

19. A machine tool combining a support; a member adjustably mounted thereon; means for clamping said member in adjusted positions; a reversible electric motor drive for said clamping means; electric circuit control means therefor including a relay switch and a time control means for said relay switch adapted upon being initially operated to maintain said electric motor drive effective until complete clamping has been effected and the motor stalled, and to thereafter automatically break the circuit, and a similar circuit for operating said motor in the reverse direction to effect unclamping.

20. A machine tool combining a frame; a member adjustably mounted thereon; means for clamping said member in adjusted positions, said means having a limited range of movement in its clamping and unclamping actions; reversible electric motor driving means for operating said clamping means; relay switch means for controlling the circuit to said motor; manually operable means for selectively initially closing said relay switch means to cause operation of said motor in either direction; and means for automatically releasing said switch means after operation of said motor for a predetermined period sufficient to move said clamping means to a completely clamped or unclamped position as the case may be.

H. HENRY SUNDERMANN,
*Executor of the Last Will and Testament of David C. Klausmeyer, Deceased.*